United States Patent [19]

Bose

[11] E Re. 31,228

Best Available Copy

[45] Reissued May 3, 1983

[54] LOUDSPEAKER SYSTEM

[75] Inventor: Amar G. Bose, Wayland, Mass.

[73] Assignee: Bose Corporation, Framingham, Mass.

[21] Appl. No.: 98,995

[22] Filed: Nov. 30, 1979

Related U.S. Patent Documents

Reissue of:

[64] Patent No.: 3,727,004
Issued: Apr. 10, 1973
Appl. No.: 115,237
Filed: Feb. 16, 1971

U.S. Applications:

[63] Continuation of Ser. No. 762,018, Jan. 24, 1977, abandoned, which is a continuation of Ser. No. 544,963, Jan. 29, 1975, abandoned, which is a continuation-in-part of Ser. No. 690,695, Dec. 4, 1967, Pat. No. 3,582,553.

[51] Int. Cl.[3] ..... H04R 1/20
[52] U.S. Cl. ..... 179/1 E
[58] Field of Search ..... 179/1 E, 1 C, 1 A; 181/144–156

[56] References Cited

U.S. PATENT DOCUMENTS

| | | | |
|---|---|---|---|
| 1,938,256 | 12/1933 | Jocobs | 179/1 D |
| 2,452,499 | 10/1948 | Siezen | 179/1 D |
| 2,610,694 | 9/1952 | De Boer | 181/147 |
| 2,701,025 | 2/1955 | Kuhl | 179/19 A |
| 2,801,704 | 8/1957 | Martin | 181/31 B |
| 2,819,772 | 1/1958 | Bryan | 181/31 B |
| 2,845,490 | 7/1958 | Knight | 179/1 D |
| 2,880,817 | 4/1959 | Burns et al. | 179/1 E |
| 2,915,588 | 12/1959 | Bose | 181/31 B |
| 3,033,945 | 5/1962 | Villchur | 181/172 |
| 3,150,739 | 9/1964 | Dones | 181/31 B |
| 3,153,120 | 10/1964 | Brown | 179/1 G |
| 3,360,072 | 12/1967 | Carlsson | 179/1 E |
| 3,365,021 | 1/1968 | Transue | 181/144 |
| 3,590,942 | 7/1971 | Globa | 181/31 B |
| 3,821,490 | 6/1974 | Bobb | 179/1 E |

FOREIGN PATENT DOCUMENTS

| | | | |
|---|---|---|---|
| 1199441 | 6/1959 | France | 179/1 E |
| 325519 | 12/1957 | Switzerland | 179/1 E |
| 891014 | 3/1962 | United Kingdom | 179/1 E |

OTHER PUBLICATIONS

*Electron*, vol. 9, No. 5, May 1972, pp. 20 & 21, Audio Lab. report, Videotone D132E Minimax 2 Loudspeaker, E. A. Welling.

"Electroacoustics", M. L. Gayford, 1971, p. 196, American Elsevier Publishing Company, Inc., 52 Vanderbilt Avenue, New York, N.Y. 10017.

Audio Engineering, Aug. 1950, pp. 9–13, M. S. Corrington, "Transient Testing of Loudspeakers".

*Elektroakustik*, Jan. 1952, p. 33, "Filter Fur Lautsprecher-Kombinationen", J. Kripl.

*Primary Examiner*—George G. Stellar
*Attorney, Agent, or Firm*—Charles Hieken

[57] ABSTRACT

A loudspeaker system includes a 10-inch high compliance woofer in a 1.5 cubic foot substantially fluid-tight enclosure. A pair of smaller speakers functioning as upper frequency radiators are supported on the top of the enclosure closely adjacent to the front edge with the axes of these small loudspeakers subtending an angle of substantially 90° so that the angle of each axis to the rear surface of the enclosure is substantially 45°. These small loudspeakers face the rear of the system, and fiberglass behind these speakers attenuates back radiation from them while being transparent to low frequency radiation produced by the woofer so that such radiation does not deflect the small speakers. The woofer and small speakers are fed in parallel, the small speakers receiving their energy through a network that allows increased transmission with increasing frequency. Both woofer and small speakers radiate energy over a common middle frequency range.

25 Claims, 7 Drawing Figures

FIG. 1
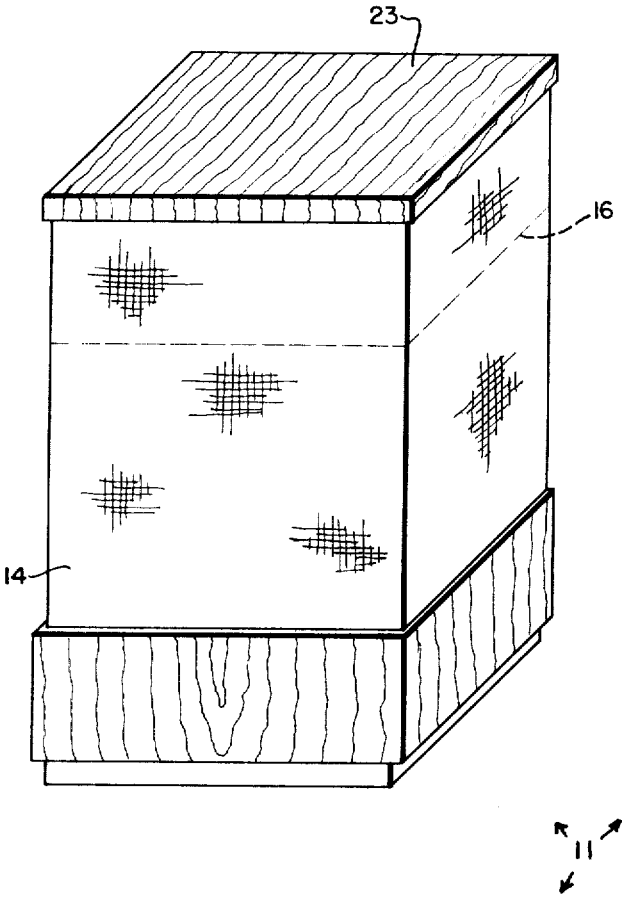
FIG. 2
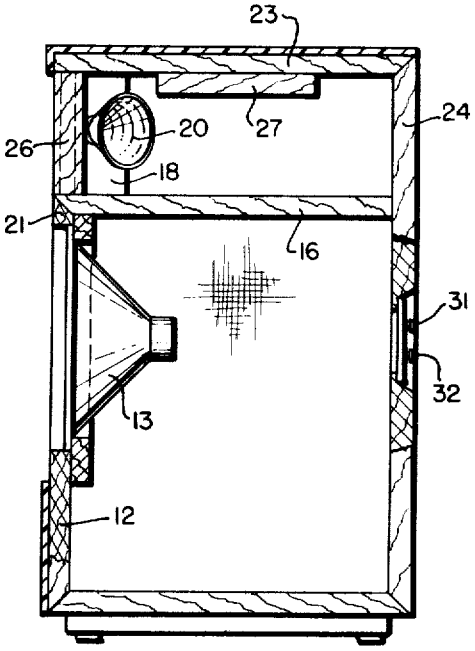
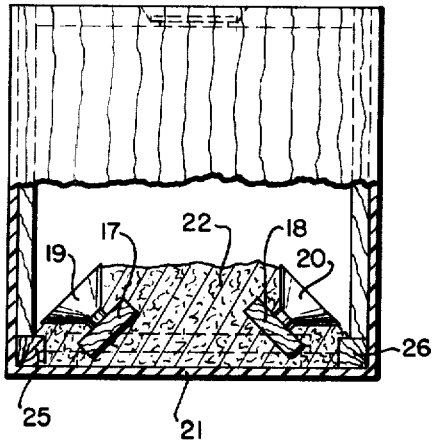
FIG. 3

FIG. 4
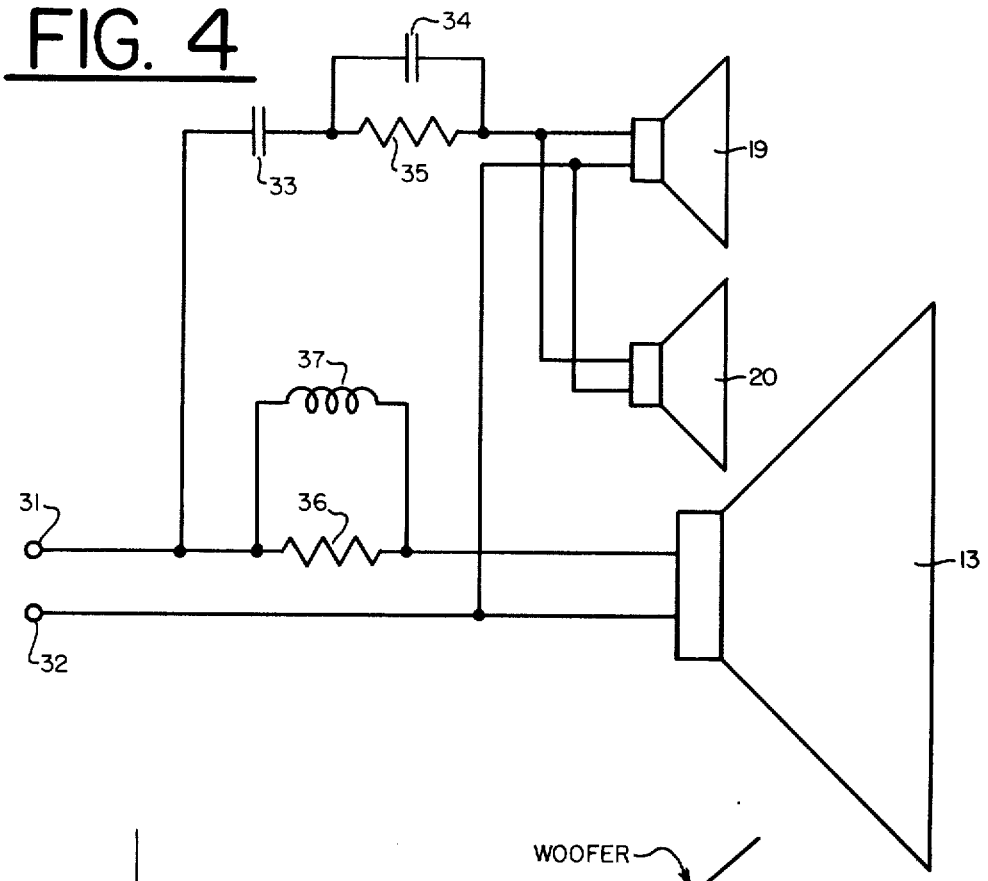
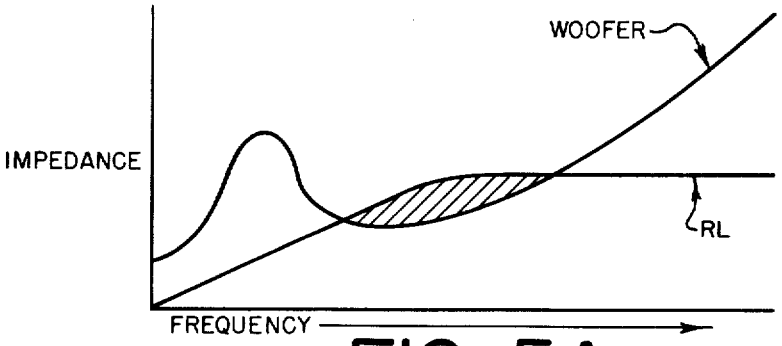
FIG. 5A
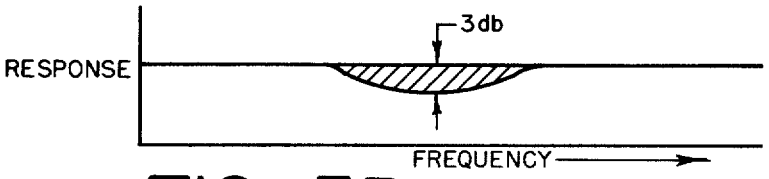
FIG. 5B

LOUDSPEAKER SYSTEM

Matter enclosed in heavy brackets [ ] appears in the original patent but forms no part of this reissue specification; matter printed in italics indicates the additions made by reissue.

[REFERENCE TO PRIOR APPLICATION]

[This application is a continuation-in-part of application Ser No. 690,695, filed Dec. 4, 1967, for LOUDSPEAKER SYSTEM, now U.S. Pat. No. 3,582,553, dated June 1, 1971.]

*REFERENCE TO PRIOR APPLICATIONS*

*This reissue application is a continuation of Ser. No. 762,018 filed Jan. 24, 1977, and now abandoned which is a continuation of Ser. No. 544,963 filed Jan. 29, 1975, and now abandoned which was a reissue application of U.S. Pat. No. 3,727,004 which was a continuation-in-part of application Ser. No. 690,695, filed Dec. 4, 1967, for LOUDSPEAKER SYSTEM, now U.S. Pat. No. 3,582,553, dated June 1, 1971.*

BACKGROUND OF THE INVENTION

The present invention relates in general to loudspeaker systems and more particularly concerns a novel loudspeaker system characterized by unusually realistic reproduction of sound at relatively low cost in an attractive package that may be conveniently located in most listening areas. The present invention represents an attempt to achieve much of the performance level of the internationally famous BOSE DIRECT/REFLECTING loudspeaker system.

That system includes eight speakers on a pair of back panels that each form an angle of about 30° with the wall upon which the rear speakers direct their sound and one speaker on the front panel that faces the room. This arrangement accomplishes two objectives. First, it radiates the desired ratio of about 8:1 reflected sound to direct sound. Secondly, by choosing the angles of the rear panel with the wall of about 30°, the BOSE DIRECT/REFLECTING 901 Loudspeaker system projects the image of a musical performance located on a stage that is about a foot behind the wall when the enclosure is about a foot in front of the wall. This arrangement establishes the musical source image to such an extent that it is possible to hear the full stereo spread from a wide range of listening positions including directly in front of one enclosure — a feat that was not possible with conventional speakers.

The BOSE 901 DIRECT/REFLECTING loudspeaker system also embodies the concept, described in a paper entitled ON THE DESIGN, MEASUREMENT AND EVALUATION OF LOUDSPEAKERS by Dr. A. G. Bose presented at the 1968 Convention of the Audio Engineering Society, of the important advance of having a uniform radiated power response as a function of frequency. Stated in other words, if you put the loudspeaker system in its normal position and apply a signal of constant level to the system input over the audio frequency range, the acoustical power radiated as a function of frequency is substantially constant.

To achieve this result it was found necessary to establish the on-axis free field pressure response characteristic of the individual loudspeakers rising with increasing frequency. This will be better appreciated when it is recognized that at low frequencies the response of the system is essentially spherical. At higher frequencies the directional characteristic is more sharply beamed; therefore, uniform power response requires that the pressure response of the individual loudspeakers on axis rise with increasing frequency. Another reason for requiring this increase in response is that at low frequencies the individual loudspeakers radiate in phase, and the total power radiated is proportional to the square of the sum of the individual pressures. At higher frequencies the radiation from the individual loudspeakers is incoherent and the total power radiated is proportional to the sum of the squares of each of the individual pressure responses. The sum of the squares is less than the square of the sum.

The importance of this discovery can better be appreciated from considering the nature of a musical instrument. Consider a violin. It is apparent that the pressure radiation characteristic of such an irregularly shaped instrument as a function of frequency is anything but uniform. Yet, when one listens to a violinist playing, the general character of the sound does not change when the violinist plays with the violin oriented differently. Although the pressure response changes with direction, the total power radiated does not. These observed results tend to support the theory of the importance of having a uniform power response as a function of frequency because the loudspeaker will radiate the same relative power in each frequency band as the original instrument.

The BOSE 901 DIRECT/REFLECTING loudspeaker system achieves these and other advantageous results with an electronic active equalizer having more than a hundred components and transistors. The use of multiple full-range speakers helps eliminate audible resonances and avoids the disadvantages associated with woofers, tweeters, and crossovers. However, the use of so many loudspeakers and components in the equalizer is costly. Still another disadvantage of that system is that it must be spaced from the wall and floor to achieve most satisfactory performance.

Accordingly, it is an important object of this invention to achieve a number of the advantages associated with the BOSE 901 DIRECT/REFLECTING loudspeaker system at lower cost.

It is a more specific object of the invention to achieve the advantages of substantially uniform power response, satisfactory ratio of reflected-to-direct sound, remarkable realism, and full stereo spread from a wide range of listening positions with a loudspeaker system that may rest on the floor against the wall and be relatively inexpensive.

SUMMARY OF THE INVENTION

According to the invention, there are means defining [a substantially fluid-tight] *an* enclosure having [high compliance] woofer means supported in front baffle means. There is means for supporting a source of at least first and second upper frequency radiated beams, such as provided by one or more small loudspeakers, on the top of the enclosure closely adjacent to the front edge thereof with the axes of each beam forming an angle and arranged for radiation with rearward components and oppositely directed sideward components. Additionally, there is means for selectively attenuating upper frequency radiation towards the front while allowing transmission of low-frequency radiation therethrough created by said woofer means.

Preferably, the distance between the front edge of the enclosure and the rear edge is about 14¼ inch so that when the enclosure is placed close to a wall, the upper frequency radiating means are about a foot from the wall. Preferably, the upper frequency radiating means are oriented so that sound reflected from the wall passes clear of the upper frequency radiating means. A preferred angle between each upper frequency radiating means axis and the rear panel is within the range of 30° to 45°. Preferably, the upper frequency radiating means and the woofer means receives energy in parallel with the source of upper frequency radiated beams receiving energy through a passive network having an attenuation characteristic that increases with decreasing frequency to provide substantially the desired uniform power response.

The woofer, which preferably extends to 1.5 kHz at least, also functions to provide direct energy to the listener.

Means such as an electrical network, may be provided for effecting a dip in the woofer infinite baffle on-axis pressure response at a predetermined frequency band above low bass, typically about 200–800 Hz.

Numerous other features, objects and advantages of the invention will become apparent from the following specification when read in connection with the accompanying drawing in which:

BRIEF DESCRIPTION OF THE DRAWING

FIG. 1 is a perspective view of a commercial embodiment of the invention:

FIG. 2 is a side view, partially in section, of the embodiment of FIG. 1 with the side removed;

FIG. 3 is a top view of the embodiment of FIG. 1 with the top removed;

FIG. 4 is a schematic circuit diagram illustrating how the woofers and tweeters may be energized; [and]

FIGS. 5A and 5B show certain frequency response characteristics helpful in understanding how a dip may be produced in a frequency range above low bass[.]; *and*

DETAILED DESCRIPTION OF PREFERRED EMBODIMENTS

Figure 6:
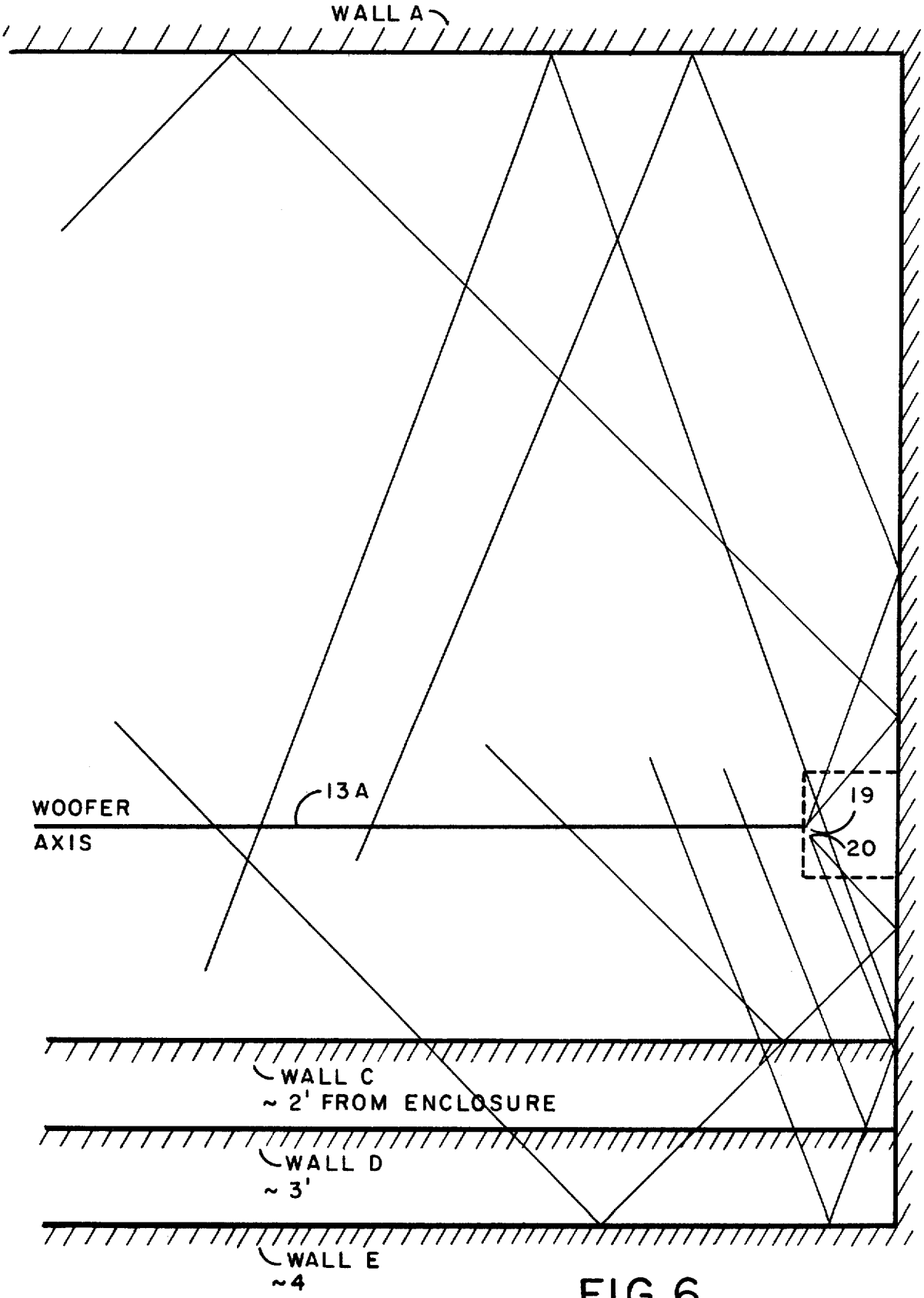
*FIG. 6 is a diagrammatic representation of a loudspeaker system according to the invention situated in a room showing how energy from the angled side tweeters is directed to the side for reflection first from a reflecting surface and then into the listening area along a path after reflection that intersects a plane perpendicular to the front panel and parallel to the side panels.*

With reference now to the drawing, and more particularly FIGS. 1–3 thereof, there is shown a perspective view of a commercial embodiment of the invention. The loudspeaker system 11 includes [an] *a substantially fluid-tight* enclosure that is preferably 1.5 cubic feet having a front panel 12 carrying a front-facing 10-inch woofer 13 behind the grill cloth 14 that is wrapped around three sides of the system for ornamental purposes. The top 16 of the enclosure is represented in broken lines in FIG. 1 and carries left and right mounting boards 17 and 18 for supporting left and right small loudspeakers 19 and 20, respectively, pointing to the left and right, respectively, and located near the front edge 21 of the enclosure. *As best seen in FIG. 3 the left and right small loudspeakers 19 and 20 comprising the upper frequency drivers, or tweeters, are oriented so that when the loudspeaker system is normally positioned in a room, the system is free of loudspeaker drivers that radiate high frequency energy directly into the listening area. The axis of each tweeter is generally parallel to a normally vertical plane bisecting the angle between the front panel and a side panel perpendicular to the front panel.* A blanket of fiber glass 22 blocks radiation from the rear of loudspeakers 19 and 20 at a certain range of higher frequencies, typically above 1.0 kHz, while allowing the lower frequencies established by woofer 13 to pass freely and thereby avoid having woofer pressure displace the tweeter diaphragm as may occur with woofers and tweeters separately enclosed.

The top 23 of the system is supported by back panel 24 and two corner posts 25 and 26. The region above the top 16 of the enclosure is thus acoustically transparent on the sides for all frequencies and on the front for low frequencies while optically opaque. At the same time top 23 may carry a lamp or other object so that the invention may function not only as a loudspeaker system but also as an attractive table.

Back panel 24 is routed for accommodating input terminals 31 and 32. The electrical network may be mounted on the plate carrying terminals 31 and 32. Leads to the woofer 13 and small loudspeakers 19 and 20 are not physically shown in FIGS. 2 and 3. They may run from the electrical network to the respective drivers in accordance with the schematic in FIG. 4 with all three drivers connected in phase. Typically the leads to the small loudspeakers may pass through a small opening in top 16 that is sealed with a caulking compound, such as Mortite, and connected to one of loudspeakers 19 and 20 with a pair of jumper wires connected to the other. *The upper frequency radiating means, such as loudspeakers 19 and 20 and the woofer means, such as woofer 13, comprise means for radiating sound energy over a predetermined common range of middle frequencies, such as between 1 kHz and 3 kHz, a range greater than half an octave. Preferably, there is means for establishing the radiation of more sound energy from the upper frequency radiating means than from the woofer means in the predetermined common range of middle frequencies with the ratio of the energy radiated by the upper frequency radiating means to that radiated by the woofer means in the common range being of the order of 2.5:1. In that common frequency range, the difference between the attenuation imparted by the means coupling the input terminals to the upper frequency radiating means and the attenuation imparted by the means coupling the input terminals to the woofer means is not appreciable, and the difference between the frequency response of energy radiated by said woofer means and the frequency response of energy radiated by said upper frequency radiating means is not appreciable over a common frequency range. The means coupling the input terminals to the upper frequency radiating means includes means such as a capacitor for blocking energy at the lower of the frequencies received by the woofer means.*

Blocks, such as 27, are carried by the underside of top 23 on the sides and front to serve as a convenient means for attaching the top of the grill cloth panels.

Preferably mounting boards 17 and 18 are centrally bored to accommodate a bolt screwed to a nut attached to the supported loudspeaker.

Referring to FIG. 4, there is shown a schematic circuit diagram illustrating electrical interconnections. Input terminals 31 and 32 present nominal impedance of substantially four ohms. Woofer 13 may be connected to terminals 31 and 32 through a network comprising resistor 36 shunted by inductor 37. One lead of each of speakers 19 and 20 may be connected to terminal 32. The other lead of each speaker may be connected to terminal 31 through a passive network comprising capacitor 33 in series with the parallel combination of capacitor 34 and resistor 35.

Woofer 13 receives energy at low frequencies while capacitor 33, typically a 10 microfarad capacitor, blocks the lower of these frequencies, typically to 1 kHz. At higher frequencies all three of drivers 13, 19 and 20 receive energy. At still higher frequencies, typically above 3 kHz, the inductance presented by the voice coil of woofer 13 appreciably reduces the energy presented to this speaker. Yet, it receives enough energy in the middle range of frequencies to radiate a desired small amount of energy directly to the listener. Typically it radiates energy of frequencies extending to 3.0 kHz.

At higher frequencies capacitor 34 increasingly bypasses resistor 35 [os] *so* that loudspeakers [17] *19* and [18] *20*, comprising the upper frequency driver or radiating means, receive more energy through this network with increasing frequency to provide the desired uniform power response. Typical values for capacitor 34 and resistor 35 are 2.0 microfarads and 6.2 ohms respectively.

The network comprising resistor 36 shunted by inductor 37 coacts with woofer voice coil resistance and inductance to effectively provide a dip in the response of the woofer at a predetermined frequency range, typically 200 to 800 HZ, that would otherwise be essentially flat. The range of inductance 37 is typically one to four mh and that of resistor 36 2.2 - 8 ohms for a 4-ohm 10-inch woofer.

FIG. 5A graphically illustrates the impedance relationship producing this dip. Typically, this dip may be of the order of 3 db as illustrated in the response shown in FIG. 5B. While the preferred arrangement here shown uses only two inexpensive components to achieve this result, it is evident that other approaches may be used to incorporate this dip, including mechanical techniques in the design of the woofer.

The woofer 13 and RL network formed by resistor 36 and inductor 37 typically have the impedance characteristics indicated. The net effect is to produce an attenuation in the woofer response where the impedance of the RL network is greater than that of the woofer to produce the dip represented in FIG. 5B.

Woofer 13 may typically be a 10-inch high compliance loudspeaker having an alnico magnet weighing 18 ounces. Tweeters 19 and 20 may typically be 4-inch speakers with an 8 ohm voice coil. With this choice of parameter values, the impedance presented at terminals 31 and 32 is substantially 4 ohms. A relatively inexpensive amplifier or receiver may be used to drive the invention.

The dimensions of the commercial embodiment of the invention are 14.5 inches wide by 14.5 inches deep by 24 inches high. Preferably the system is placed against the wall at least 2 feet from a corner. Two such systems are used for stereo reproduction *as shown in FIG. 6 which shows how the tweeter 20 closer to any of walls C, D and E shown about two feet, three feet and four feet, respectively, from the enclosure, than to wall A radiates energy to the side for reflection first from a reflecting surface, such as one or more of walls A-E and then into the listening area along a path after reflection that intersects a plane perpendicular to front panel 12 and parallel to the side panels including the axis 13A of woofer 13 in the listening area.* The sound quality of the commercial embodiment more closely approaches the quality of the sound produced by the BOSE 901 DIRECT/REFLECTING loudspeaker system than any other loudspeaker does.

In an actual commercial embodiment of the invention, excellent performance has been obtained without resistors 35 and 36, capacitor 34 and inductor 37. One terminal of drivers 19 and 20 is then connected to capacitor 33 directly, and one terminals of driver 13 is connected to terminal 31 directly. Sufficient uniformity of power response and ratio of energy radiated after reflection to energy radiated directly has been achieved to outperform any known loudspeaker system, except the BOSE 901 DIRECT/REFLECTING system, costing up to the price of the latter. Yet, this commercially available BOSE 501 DIRECT/REFLECTING system according to the invention sells for just over half the price of the BOSE 901.

It is evident that those skilled in the art may now make numerous uses and modifications of and departures from the specific embodiments described herein without departing from the invented concept. Consequently, the invention is to be construed as embracing each and every novel feature and novel combination of features present in or possessed by the apparatus and techniques herein disclosed.

What is claimed is:

1. A loudspeaker system comprising, means defining [a substantially fluid tight] *an* enclosure having generally parallel back and front panels,

[high compliance] woofer means secured to said front panel facing outward from said enclosure for radiating energy directly into a listening area, a source of at least first and second upper frequency radiated beams supported on the top of said enclosure outside said enclosure and oriented for radiating energy having rearward components and oppositely directed sideward components comprising first and second loudspeakers respectively facing rearwards and sidewards to opposite sides, a pair of input terminals, means for connecting said woofer means to said input terminals, and frequency sensitive passive attenuating means for coupling said loudspeakers in phase to said input terminals for transmitting signals from said input terminals to said source only above a predetermined low frequency while providing said loudspeakers more energy as a function of increasing frequency to coact with said woofer means to establish for said loudspeaker system a substantially uniform radiated power response as a function of frequency when normally positioned in a room with said back panel adjacent and substantially parallel to a wall and said front panel facing the listening area.

2. A loudspeaker system in accordance with claim 1 wherein said woofer means and said source comprise means for radiating sound energy over a predetermined common range of middle frequencies, said woofer comprising means for exclusively radiating sound energy below said common range.

3. A loudspeaker system in accordance with claim 2 and further comprising means for establishing the radiation of more sound energy from said source than from said woofer means in said predetermined common range.

4. A loudspeaker system in accordance with claim 3 wherein the ratio of the energy radiated by said source to that radiated by said woofer means in said common frequency range is of the order 2.5:1.

5. A loudspeaker system in accordance with claim 1 *wherein said top has front and rear edges near said front and back panels respectively* and further comprising, acoustical attenuating means between said source and said front edge for attenuating upper frequency energy directed toward the front of said loudspeaker system from said source while being acoustically transparent to low frequency energy radiated by said woofer means.

6. A loudspeaker system in accordance with claim 1 wherein said source comprises first and second small loudspeakers seated on said top with their axes pointing in a direction having a rearward component and opposed sideward components.

7. A loudspeaker system in accordance with claim 6 wherein the angle between each of said axes and the plane of said front panel is within the range of 30°–45°.

8. A loudspeaker system in accordance with claim 7 *wherein said top has front and rear edges near said front and back panels respectively* and further comprising fiberglass acoustical attenuating means between said small loudspeakers and said front edge for attenuating upper frequency energy directed toward the front of said loudspeaker system from said small loudspeakers while transmitting low frequency energy produced by said woofer means.

9. A loudspeaker system in accordance with claim 8 and further comprising a top cover of said loudspeaker system above said small loudspeakers, and means for covering the sides of the region between the latter top and said top of the enclosure with material that is optically opaque and acoustically transparent.

10. A loudspeaker system in accordance with claim 9 and further comprising front cover posts between the front corners of said tops and a back plate between the centers of the back edges of said tops for supporting the latter top on said top of the enclosure while presenting a substantially acoustically transparent opening to said first and second beams. [

11. A loudspeaker system in accordance with claim 1 and further comprising, frequency sensitive passive attenuating means for coupling said source to said input terminals while imparting progressively less attenuation with increasing frequency.

[12. A loudspeaker system in accordance with claim 1 and further comprising, the parallel combination of an inductor and resistor between said woofer means and one of said input terminals for slightly attenuating signals within a predetermined middle range of frequencies.

13. A loudspeaker system in accordance with claim 12 wherein said predetermined range is substantially 100 to 800 Hz.

14. A loudspeaker system in accordance with claim 12 wherein the value of said inductance is within the range of 1 to 4 millihenries and that of said resistor is within the range of 2.2 – 8 ohms and said woofer means has a nominal impedance of substantially 4 ohms.

15. A loudspeaker system in accordance with claim 1 wherein said source is located closely adjacent to the front edge of said top.

16. A loudspeaker system in accordance with claim [1] *15* wherein said woofer means and said source comprise means for radiating sound energy over a predetermined common range of middle frequencies, said woofer comprising means for exclusively radiating sound energy below said common range.

17. A loudspeaker system in accordance with claim 1 having only three loudspeaker drivers, one of which is said woofer means and the second and third of which are said first and second loudspeakers respectively.

18. A loudspeaker system comprising, means including woofer means defining [a substantially fluid-tight] *an* enclosure, said woofer means being for radiating acoustical energy *to the front directly into the listening area* having spectral components at least in the low range of audio frequencies below a predetermined crossover frequency, first and second like upper frequency driver means with means for attenuating rear radiation therefrom supported upon but outside said enclosure and having their axes pointing toward opposite sidewards directions for radiating acoustical energy having spectral components in the upper range of audio frequencies above said predetermined crossover frequency toward opposite sides of said enclosure, the region to the side of each of said upper frequency driver means being substantially completely acoustically transparent, said first and second upper frequency driver means being connected together for cophasally radiating substantially the same signal, an input terminal pair for receiving an audio electrical signal, and crossover network means for coupling energy from said input terminal pair with spectral components below and above said predetermined crossover frequency to said woofer means and the connected-together upper frequency driver means respectively while substantially blocking spectral components below said predetermined crossover frequency from the latter driver means including means for coupling to said first and second like upper frequency driver means more energy as a function of frequency to establish the on-axis pressure response thereof increasing with increasing frequency to coact with said woofer means to establish for said loudspeaker system a radiated power response as a function of frequency when normally positioned in a room that approaches uniformity more nearly than if said on-axis response were substantially uniform.

19. A loudspeaker system in accordance with claim 18 having only three loudspeaker drivers, one of which is said woofer means and the second and third of which are said first and second upper frequency driver means respectively.

20. A loudspeaker system in accordance with claim 18 wherein said means defining [a substantially fluid-tight] *an* enclosure has generally parallel back and front panels with said woofer means being high compliance and secured to said front panel facing outwardly from said enclosure whereby said loudspeaker system is normally positioned in a room with said back panel adjacent a wall and said front panel facing the listening area.

21. A loudspeaker system in accordance with claim 18 wherein said means for coupling comprises a resistively shunted capacitor connected intermediate said connected together upper frequency driver means and said input terminal pair.

*22. A loudspeaker system comprising,*

*cabinet means for supporting loudspeaker drivers and having a front panel perpendicular to side panels,*

*first loudspeaker driver means supported by said cabinet on said front panel for radiating sound energy to the front directly into the listening area before reflection from a reflecting surface over a first frequency range and having a first polar response,*

*second loudspeaker driver means supported by said cabinet for radiating sound energy to the side for reflection first from a reflecting surface and then into the listening area along a path after reflection that intersects a plane perpendicular to said front panel and parallel to said side panels in said listening area over a second frequency range mostly higher than said first frequency range and having a second polar response different from said first polar response,*

*the axis of said second loudspeaker driver means being generally parallel to a normally vertical plane that bisects the angle between said front and side panels,*

*an input terminal pair,*

*and means for intercoupling said input terminal pair and said first and second loudspeaker driver means for providing spectral components in a common frequency range to said first and second loudspeaker driver means so that the difference between the frequency response of energy radiated by said first loudspeaker driver means and the frequency response of energy radiated by said second loudspeaker driver means in said common frequency range is not appreciable,*

*said means for intercoupling coacting with said first and second loudspeaker driver means to comprise means for dissimilarly radiating from first and second locations defined by said first and second loudspeaker driver means respectively spectral components over said common frequency range to provide a spatially diffuse source,*

*said common frequency range being at least half an octave.*

*23. A loudspeaker system in accordance with claim 22 wherein said common frequency range embraces 1 to 3 kHz.*

*24. A loudspeaker system in accordance with claim 22 wherein said first loudspeaker driver means supported by said cabinet for radiating sound energy comprises a woofer facing the front and said second loudspeaker driver means supported by said cabinet for radiating sound energy comprises tweeter means for radiating sound energy to the rear and side.*

*25. A loudspeaker system comprising,*

*means including front and side panels with woofer means seated in said front panel for defining an enclosure,*

*said woofer means being for radiating acoustical energy to the front directly into the listening area before reflection from a reflecting surface having spectral components at least in the low range of audio frequency below a predetermined crossover frequency,*

*at least one upper frequency driver means having its axis pointing in a sideward direction at an angle to the axis of said woofer means for radiating acoustical energy first upon a reflecting surface and then into the listening area along a path after reflection that intersects a plane perpendicular to said front panel and parallel to said side panels in said listening area having spectral components in the upper range of audio frequencies above said predetermined crossover frequency to the side of said enclosure,*

*an input terminal pair for receiving an audio electrical signal,*

*and crossover network means for coupling energy from said input terminal pair with spectral components below and above said predetermined crossover frequency to said woofer means and to said upper frequency driver means respectively while substantially blocking spectral components below said predetermined crossover frequency from the latter driver means including means for coupling to said upper frequency driver means more energy as a function of frequency to establish the on-axis pressure response thereof increasing with increasing frequency to coact with said woofer means to establish for said loudspeaker system a radiated power response as a function of frequency when normally positioned in a room that is substantially uniform over nearly the entire range of audible frequencies.*

* * * * *